United States Patent
Yao et al.

(10) Patent No.: US 11,513,360 B2
(45) Date of Patent: Nov. 29, 2022

(54) ENHANCED CONTRAST AUGMENTED REALITY (AR) TAGS FOR VISUAL FIDUCIAL SYSTEM

(71) Applicant: TOYOTA RESEARCH INSTITUTE, INC., Los Altos, CA (US)

(72) Inventors: Jonathan Yao, San Jose, CA (US); Daniel Brooks, Arlington, MA (US); Vincent S. Pascual, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/932,696

(22) Filed: Jul. 17, 2020

(65) Prior Publication Data

US 2022/0019086 A1    Jan. 20, 2022

(51) Int. Cl.
*G02B 27/01* (2006.01)
*G06F 3/01* (2006.01)
(Continued)

(52) U.S. Cl.
CPC ..... *G02B 27/0179* (2013.01); *G02B 27/0172* (2013.01); *G06F 3/011* (2013.01);
(Continued)

(58) Field of Classification Search
CPC .. G06F 3/011–013; G06F 1/163; G06F 3/012; H04N 5/353; H04N 9/3152;
(Continued)

(56) References Cited

U.S. PATENT DOCUMENTS 9,891,705 B1 *   2/2018  Lahr .................... G06K 9/2054
10,589,625 B1    3/2020  Goslin
(Continued)

FOREIGN PATENT DOCUMENTS

CN    106482725 A    3/2017
EP    2860697 A1     4/2015
(Continued)

OTHER PUBLICATIONS

Brvision IP69K Brake Light RearView Camera for Fiat Ducato, https://micbrvision.en.made-inchina, com/product/kCOQmirJsUcP/China-Brvision-IP69K-Brake-Lig ht-Rear-View-Camera-for-FIAT-Ducato.html Nov. 5, 2019.

*Primary Examiner* — Xuemei Zheng
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for improved visual fiducials and detection. A plurality of high-contrast visual fiducials are disposed within an environment (e.g., a vehicle interior). Each high-contrast visual fiducial comprises a pattern layer disposed on a translucent base, the pattern layer comprising an opaque material with one or more pattern components disposed therein. The high-contrast visual fiducials are configured to enable light to pass through the translucent base and through the one or more pattern components of the pattern layer. One or more wearable devices can be configured to detect light passing through the pattern components, the wearable devices communicatively coupled to a detection system configured to decode the received light pattern.

9 Claims, 12 Drawing Sheets

(51) Int. Cl.
*B60K 35/00* (2006.01)
*G06K 7/14* (2006.01)

(52) U.S. Cl.
CPC ...... *B60K 35/00* (2013.01); *G02B 2027/0138* (2013.01); *G02B 2027/0187* (2013.01); *G06K 7/143* (2013.01)

(58) Field of Classification Search
CPC ........... G06T 19/006; G06T 7/33; G06T 7/73; G06T 2207/30204; G06T 2207/30208; G06T 2207/10152; G06K 19/14; G06K 9/0004; G06K 7/143; G06K 7/1417; G02B 27/0093; G02B 27/017–0179; G02B 2027/0187; G02B 2027/0138; G02B 2027/0178; G02B 2027/014; G02B 2027/0141; B60K 35/00; B60K 2370/1529; B60K 2370/177; B60K 2370/92

See application file for complete search history.

(56) References Cited

U.S. PATENT DOCUMENTS

| | | | |
|---|---|---|---|
| 11,036,453 B1* | 6/2021 | Jarrett | G06F 3/012 |
| 2011/0235054 A1* | 9/2011 | Koike | B25J 9/1697 |
| | | | 356/620 |
| 2020/0042078 A1* | 2/2020 | Xu | G01S 5/30 |

FOREIGN PATENT DOCUMENTS

| | | |
|---|---|---|
| WO | 2013049248 A2 | 4/2013 |
| WO | 2019037605 A1 | 2/2019 |
| WO | 2019165147 A1 | 8/2019 |

\* cited by examiner

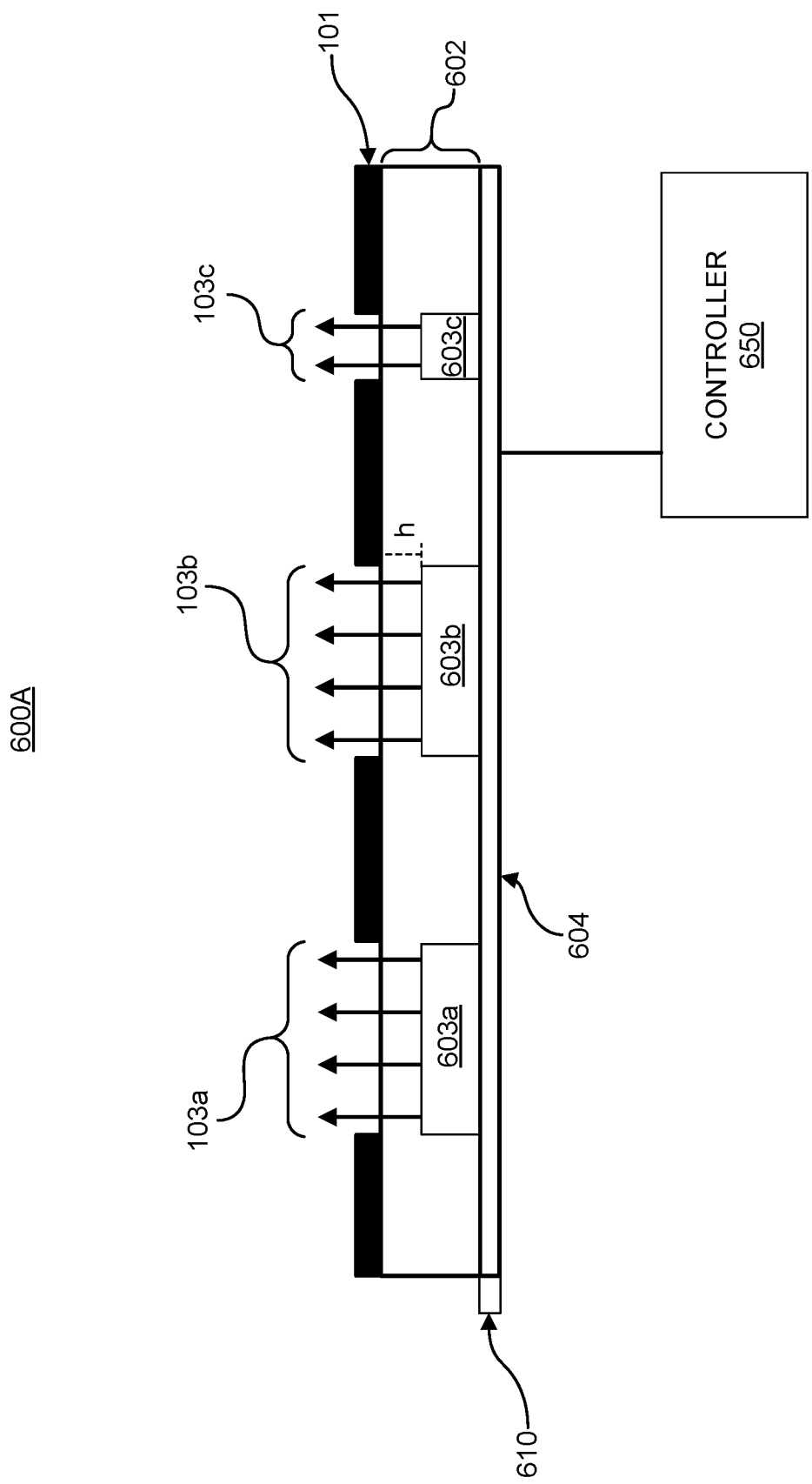

ENHANCED CONTRAST AUGMENTED REALITY (AR) TAGS FOR VISUAL FIDUCIAL SYSTEM

TECHNICAL FIELD

The present disclosure relates generally to augmented reality, and in particular, some implementations may relate to increased contrast AR tags for enhanced detection.

DESCRIPTION OF RELATED ART

A fiducial marker (or simply "a fiducial") is an object placed in the field of view of an imaging system. A fiducial provides a point of reference within the field of view for various applications, and in some implementations can be used to encode data that can be obtained when the fiducial is scanned. A common fiducial is the quick response (QR) code.

BRIEF SUMMARY OF THE DISCLOSURE

According to various embodiments of the disclosed technology, a system is provided comprising a plurality of high-contrast visual fiducials disposed within a vehicle interior, each high-contrast visual fiducials comprising a pattern layer disposed on a top surface of a translucent base; one or more wearable devices; and a visual fiducial detection system communicatively coupled to the one or more wearable devices, wherein the plurality of high-contrast visual fiducials are configured to configured to enable light to pass through the translucent base and through the one or more pattern components of the pattern layer.

In various embodiments, the plurality of high-contrast visual fiducials comprises a first set of high-contrast visual fiducials disposed on a windshield of the vehicle interior, a side widow of the vehicle interior, a sunroof window of the vehicle interior, or a rear window of the vehicle interior, or a combination thereof; and a second set of high-contrast visual fiducials disposed on a non-window portion of the vehicle interior.

In various embodiments, the second set of high-contrast fiducials comprises one or more extended visual fiducials comprising at least one optical fiber configured to route light from an external source to the respective translucent base.

In various embodiments, the translucent base can comprise a plurality of light tubes configured to route light from a first surface of the translucent base to a second surface of the translucent base, wherein the first surface comprises a side of the translucent base disposed on the windshield of the vehicle interior, the side widow of the vehicle interior, the sunroof window of the vehicle interior, or the rear window of the vehicle interior, or a combination thereof.

In various embodiments, the plurality of light tubes are disposed to correspond to each of the pattern components of the pattern layer.

In various embodiments, the translucent base of each respective extended visual fiducial includes one or more reflective surfaces configured to reflect the light from the external source from the at least one optical fiber from a first direction to a second direction, wherein the first direction is parallel to the pattern layer and the second direction is perpendicular through the one or more pattern components.

In various embodiments, the second set of high-contrast fiducials comprises one or more active visual fiducials comprising one or more light sources integrated within the translucent base of the respective active visual fiducial.

In various embodiments, the one or more light sources comprises one or more light emitting diodes (LEDs) and configured to emit light through one or more of the pattern components.

In various embodiments, the system can further comprise a controller communicatively coupled to each of the one or more active visual fiducials.

In various embodiments, the system can further comprise one or more light sources configured to detect lighting conditions around one or more of the second set of high-contrast visual fiducials and communicatively coupled to the controller.

In various embodiments, a method comprises disposing a plurality of high-contrast visual fiducials within a vehicle interior; receiving, from a first set of cameras of a wearable device, a first plurality of fiducial data; receiving, from a second set of cameras of the wearable device, a second plurality of fiducial data; associating the first plurality of fiducial data and the second plurality of fiducial data; and identifying a person wearing the wearable device based on the associated first plurality of fiducial data and the second plurality of fiducial data, wherein the high-contrast visual fiducials are configured to enable light to pass through one or more pattern components of a pattern disposed on a translucent base.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6A illustrates an example active visual fiducial in accordance with embodiments of the technology disclosed herein.

Figure 1:
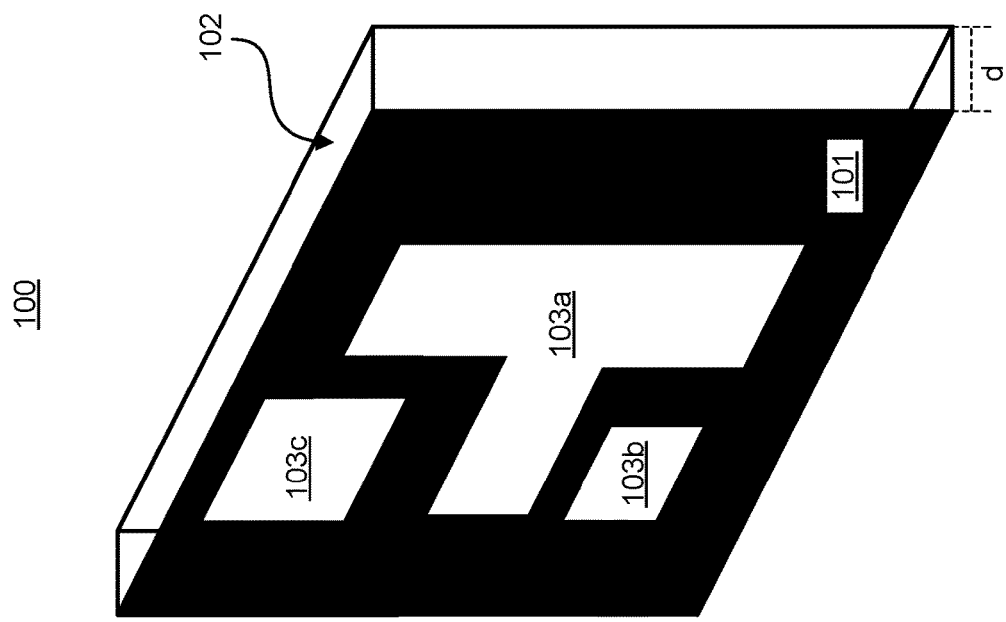
FIG. 1 is an example high-contrast fiducial in accordance with embodiments of the technology disclosed herein.

The figures are not exhaustive and do not limit the present disclosure to the precise form disclosed.

DETAILED DESCRIPTION

Visual fiducials are utilized in a variety of different fields. One such field is in the design of vehicle interiors and interfaces to enable novel interaction between a person (either driver or passenger) with one or more interfaces within the vehicle. Human-machine interaction (HMI) research uses fiducials (e.g., audio, visual, etc.) to obtain data identifying where the person's focus is at a given time during operation of the vehicle. This information can be used to develop a "workflow" for the person during operation, identifying where a person is focused and when and how long the person's focus remained on that spot during operation. Using this information, designers can determine how to configure the HMI interfaces within the vehicle to provide newer and more organic methods for a person to interface with systems during vehicle operation. In this way, the HMI interfaces can be designed in a safer manner.

To obtain this HMI information, a plurality of visual fiducials are placed around various points within the cabin of the vehicle. Non-limiting examples of fiducial locations include areas of the windshield, pillars, infotainment systems, instrument clusters, among others. Persons within the vehicle, such as the driver and/or passenger(s), can be equipped with a pair of glasses configured with one or more cameras focused on the person's eyes, and one or more cameras directed to capture the person's line of sight. The outward facing one or more cameras are configured to capture one or more visual fiducials within the line of sight of the person. The visual fiducials provide a reference for use in identifying the person's focus, both in terms of direction and location. The visual fiducials can be used in performing point-to-polygon type analysis, with the visual fiducials providing a coordinate system defined by the fiducial. For example, if a person wearing the glasses gazes at a fiducial on the windshield, the point-to-polygon test can be used to verify that the person looked at the location of the fiducial.

In order for this visual fiducial system to operate properly, however, the fiducials must be detected. Specifically, such fiducial systems generally rely on edge detection to capture the pattern. Detection of the fiducials is effected by the amount of light within the environment. In dark environments, the fiducials may be difficult to differentiate from the background because of the lack of light. In environments with more light, the visibility of the fiducials can vary based on the amount of light present, making detection sporadic. As an example, fiducials within a vehicle can be washed out by sunlight entering through the windows (e.g., windshield), making it difficult to detect the fiducial. One reason for this effect is the dependency of visual fiducial system on a sharp contrast of the fiducial markings. Generally, the visual fiducials are opaque, having a (usually) black and white pattern. Where the fiducials are disposed on surfaces that enable back lighting (e.g., windshields), the fiducials are not easily detectable because of the light coming from behind the fiducial, making the fiducial appear artificially darker. This glare reduces the ability of the cameras of the system to detect the fiducials. Moreover, although opaque, in some instances light can seep through the fiducial in both the black and the white portions, which further reduces the contrast of the pattern edges.

Moreover, the amount of data captured during visual fiducial detection processes is constantly increasing as technology advances. This amount of information can become unwieldly to analyze. A data scientist or other engineer has to go through the received data to make associations between data and identify the person's focus during operation of the vehicle. As a non-limiting example, associating the eye position of the person with one or more visual fiducials is an intensive process requiring a data scientist to comb through the vast amount of data to make the associations. Poor detection of visual fiducials makes this process more cumbersome and difficult to perform.

Embodiments of the systems and methods disclosed herein can provide visual fiducial systems less sensitive to the lighting conditions. In various embodiments, high-contrast visual fiducials can be disposed within an environment, such as a vehicle interior. The high-contrast fiducials can be configured to enable light to pass through a pattern layer, increasing the contrast of the pattern of the pattern component for easier detection by a detection system. The fiducials can include a translucent base configured to guide light from a light source behind the pattern layer through the pattern components of the pattern layer.

FIG. 1 illustrates an example high-contrast fiducial 100 in accordance with embodiments of the technology disclosed herein. The example high-contrast fiducial 100 is provided for illustrative purposes only and should not be interpreted as limiting the scope of the technology to only the depicted embodiment. As shown in FIG. 1, the high-contrast fiducial 100 comprises a pattern layer 101 disposed on a translucent base 102. The pattern layer 101 is configured to encode one or more types of determination data. Non-limiting examples of types of encoding patterns that can comprise the pattern layer 101 include QR codes, augmented reality (AR) codes, data matrix, EZcode, AprilTag codes, Q code, or other types of pattern encoding schemes known now or to be developed in the art. In various embodiments, the pattern layer 101 can encode ground truth determination data, including but not limited to one or more coordinates of a 2-D coordinate plane of the surface on which the high-contrast fiducial 100 is located, an associated numeral or other reference variable, or other determination data used in identifying the pattern layer 101 within space. In various embodiments, the pattern layer 101 can comprise an opaque material configured to not allow light to pass through, including but not limited to glass, plexiglass, plastic, latex, acrylic, photonic silicon, or metal, among others.

For ease of discussion, the pattern layer 101 is shown as a plane, but in other embodiments the pattern layer 101 can have a depth, similar to the depth d shown for the translucent base 102. In various embodiments, the pattern layer 101 can be printed onto an opaque material, etched into an opaque material, or formed on the translucent base 102 (e.g., layer disposition), among other manners of generating patterned materials known in the art. In various embodiments, the pattern layer 101 can comprise one or more materials. The pattern components 103*a*-103*c* (generally, "the pattern component 103," collectively, "the pattern components 103") can comprise openings within the pattern layer 101.

In various embodiments, the translucent base 102 can be configured to enable light to pass through and provide a uniform background for the pattern layer 101. Traditional visual fiducials are generally opaque to provide a uniform background against which the encoding pattern can contrast. However, as discussed above, the opaqueness of traditional visual fiducials, although being internally contrasted, is not well contrasted against the background light entering through the windshield or other window of the vehicle. Using the translucent base 102, the high-contrast fiducial 100 enables the encoding pattern on the pattern layer 101 to be passively lit. The light passing through the pattern components 103 serves to more clearly contrast the encoding pattern against the background light. In this way, the glare created around the edges of the high-contrast fiducial 100 is compensated by the internal light shining through the pattern components 103. In various embodiments, the translucent material 102 can comprise one or more of plastic, glass, plexiglass, acrylic, or other type of material that is configured to pass light without enabling the world scene to be visible. As shown in FIG. 1, the translucent layer 102 can comprise a depth d, while in other embodiments the translucent layer 102 can comprise a sheet having a negligible depth d.

In various embodiments, the pattern layer 101 can be connected to the translucent base 102 by one or more of types of fasteners and/or adhesives. Non-limiting examples of fasteners and/or adhesives that can be used include glue, tape, mechanical fasteners (e.g., staples), among others. In various embodiments, the pattern layer 101 can be printed or painted onto the translucent base 102.

Figure 2:
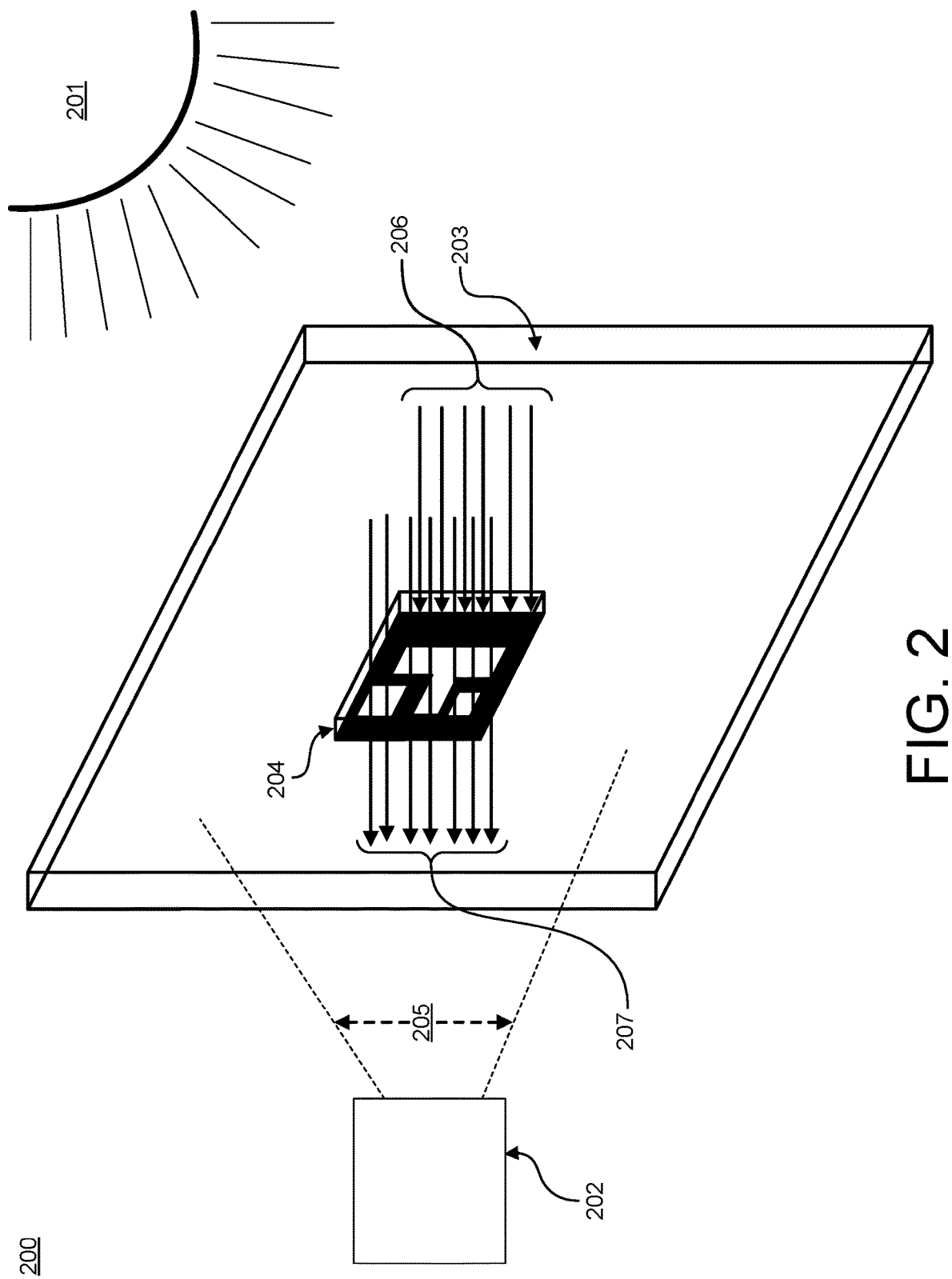
FIG. 2 illustrates an example fiducial system in accordance with embodiments of the technology disclosed herein.

As discussed above, the translucent layer 102 enables the high-contrast fiducial 100 to be passively back-lit. FIG. 2 illustrates an example fiducial system 200 in accordance with embodiments of the technology of the present disclosure. The example fiducial system 200 is provided for illustrative purposes only and should not be interpreted as limiting the scope of the technology of the present disclosure. Where references are common between figures it should be interpreted that the discussion of such references apply equally to all uses of the reference unless expressly stated otherwise. For ease of discussion, only one visual fiducial is shown, but there can be a plurality of visual fiducials within the example fiducial system 200 in other embodiments, and the depicted embodiment should not be used to limit the scope of the technology. Moreover, the example fiducial system 200 shall be discussed with respect to an implementation within a vehicle. Non-limiting examples of vehicles include, automobiles, trucks, SUVs, airplanes, boats, among others. Although discussed with respect to such an example the technology disclosed herein is applicable to any fiducial system where light is of concern (e.g., inconsistent lighting).

As shown in FIG. 2, the fiducial system 200 can comprise a visual fiducial 204 disposed on a window 203. In various embodiments, the visual fiducial 204 can be similar to the example high-contrast fiducial 100 discussed with respect to FIG. 1. In other embodiments, the visual fiducial 204 can be similar to one or more other high-contrast fiducial embodiments discussed with respect to FIGS. 3-10. As shown in FIG. 2, the visual fiducial 204 is disposed on an interior face of the glass 203. In various embodiments, the window 204 can comprise a windshield, a side mirror, or sun roof window, and/or a rear window of a vehicle. In various embodiments, the window 203 can comprise any type of clear material, including but not limited to glass, plexiglass, tempered glass, plastic, among others.

A detection system 202 is disposed within an interior and configured to capture the real-world scene within a field of view 205 of the detection system 202. In various embodiments, the detection system 202 can be disposed on a platform configured to follow the direction of a person's line of sight, including but not limited to glasses, helmets, among others. In some embodiments, the detection system 202 can comprise one or more image sensors (not shown in FIG. 2) configured to capture the real-world scene of a person and/or the person's eyes. In some embodiments, the detection system 202 can include processing circuitry configured to identify the determination data encoded within a visual fiducial 204. The detection system 202 is not stationary, but capable of moving in accordance with the movement of the person's eyes and/or head.

In the depicted embodiment of FIG. 2, the visual fiducial 204 is shown as falling within the field of view 205 of the detection system 202. The visual fiducial 204 is within the real-world scene captured by the detection system 202. As light passes through the windshield 203, a portion of the light 206 passes through the translucent base of the visual fiducial 204 and is blocked by the pattern layer of the visual fiducial 204. Another portion of the light 207 passes through the translucent base and through the pattern layer (via the pattern components) of the visual fiducial 204. In this way, the portion of light 207 is allowed to pass through the visual fiducial 204 and be detected by the detection system 202. In this way, the visual fiducial 204 has a greater contrast with the other light from the external light source 201. In the illustrated embodiment, the external light source 201 is illustrated as the sun, but in other embodiments the external light source 201 may be one or more natural and/or man-made light sources. Non-limiting examples include street lamps, moonlight, headlights, signals, among others. The external light source 201 can comprise any source of light that is capable of passing through the glass 203.

Using the external light, which naturally back lights the visual fiducial 204, embodiments of the technology disclosed herein provides a greater contrast between the visual fiducial 204 and the light entering through the rest of the window 203. If the visual fiducial 204 comprised a traditional, opaque fiducial, the light would not pass through any portion of the fiducial. However, light along the edges of the fiducial can wash out the fiducial pattern, reducing the visibility and contrast of the fiducial against the light. This effect makes the fiducial appear artificially darker. By allowing the light to pass through the translucent base 102 of the visual fiducial 204, this washout effect can be mitigated. The portion of light 207 results in the edges of each pattern component of the visual fiducial 204 being sharper and having greater contrast with the background. Therefore, the detection system 202 can more easily and clearly capture and register the visual fiducial 204.

Figure 3B:
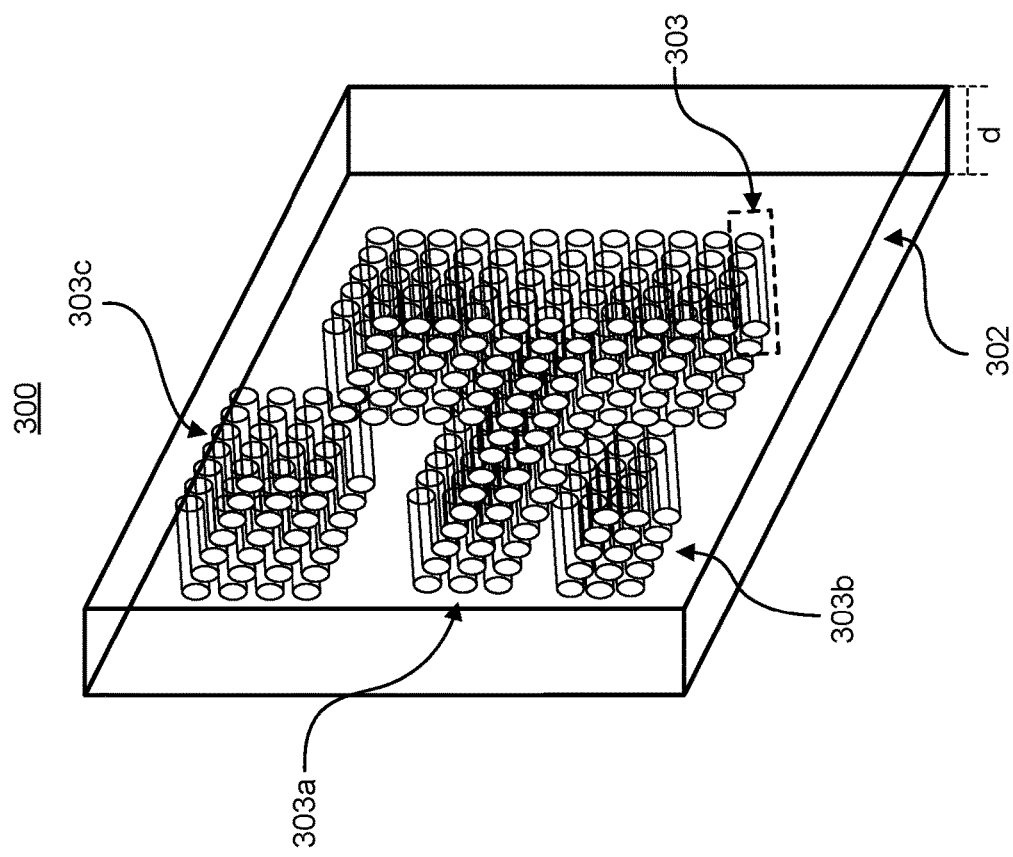
FIG. 3B illustrates an example translucent base of the example guided light fiducial of FIG. 3A.
Figure 3A:
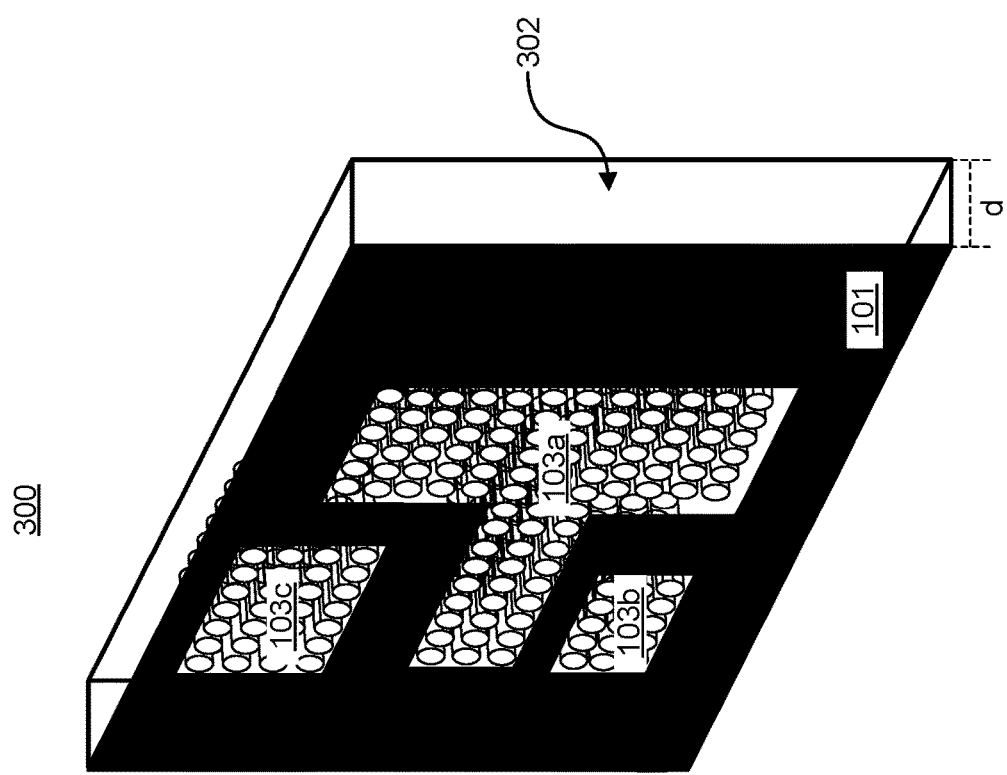
FIG. 3A illustrates an example guided light fiducial in accordance with embodiments of the technology disclosed herein.

In various embodiments, one or more optical routing elements can be included within the translucent base to further control the direction of light within the visual fiducial. FIGS. 3A and 3B illustrate a guided light fiducial 300 in accordance with embodiments of the technology of the present disclosure. The example guided light fiducial 300 is provided for illustrative purposes only and should not be interpreted as limiting the scope of the technology to only the depicted embodiment. Where common references are used it should be interpreted that the discussion of such references apply to all figures having the reference unless expressly stated otherwise. As shown in FIG. 3A the guided light fiducial 300 comprises a pattern layer 101 similar to the pattern layer 101 discussed with respect to FIG. 1. The pattern layer 101 is disposed on a light tube translucent base 302. In various embodiments, the light tube translucent base 302 can have a depth d.

FIG. 3B illustrates the example translucent base 302 of the guided light fiducial 300. A plurality of light tubes 303 are disposed within the translucent base 302. Each of the light tubes 303 is configured to guide light from a first side of the translucent base 302 to the second side of the translucent base 302. In various embodiments, the light tubes 303 can be drilled, etched, or otherwise fabricated into the translucent base 302. The plurality of light tubes 303 can be disposed in pattern groups 303*a*-303*c* (generally, "the pattern group 303," collectively, "the pattern groups 303"), each pattern group 303 configured to correspond with each of the pattern components 103 of the pattern layer 101 in some embodiments. For ease of references, the correspondence is illustrated in FIGS. 3A and 3B by having the pattern components 103 be transparent to show the positioning of the light tubes 303, but in implementation each pattern component 103 would be translucent and the specific light tubes 303 would not be individually identifiable. Nothing should be interpreted from the depiction to limit the scope of the technology to only embodiments wherein the individual light tubes 303 are visible through the pattern components 103.

Figure 3D:
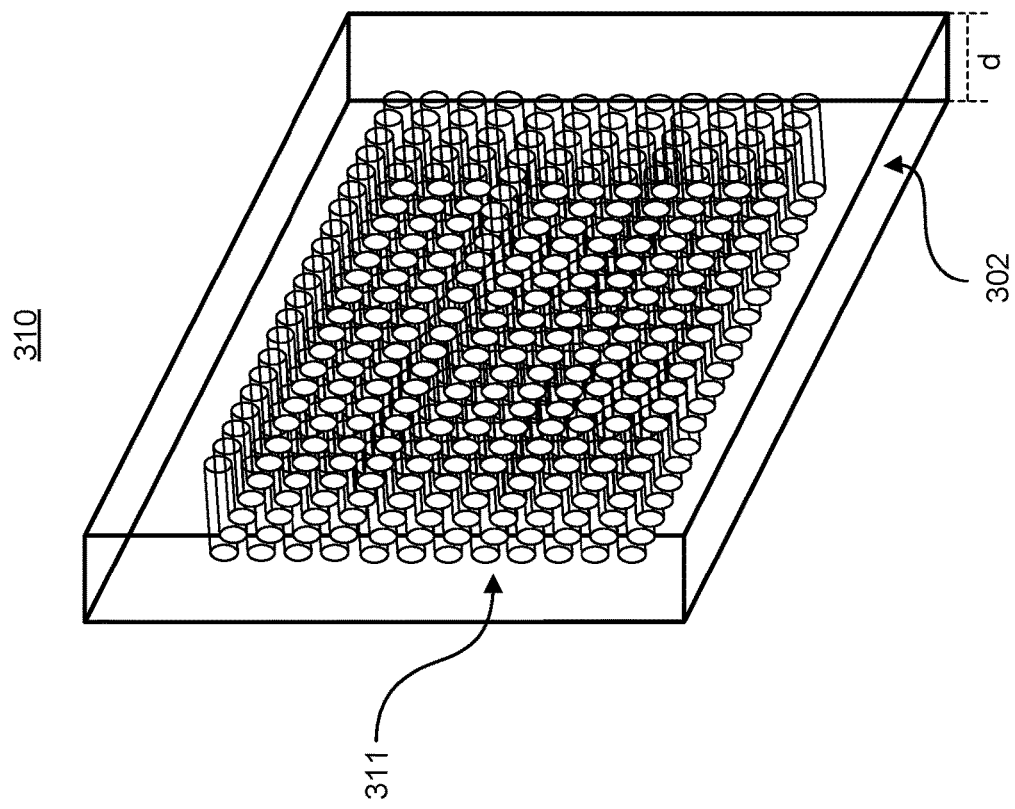
FIG. 3D illustrates an example translucent base of the example guided light fiducial of FIG. 3C.
Figure 3C:
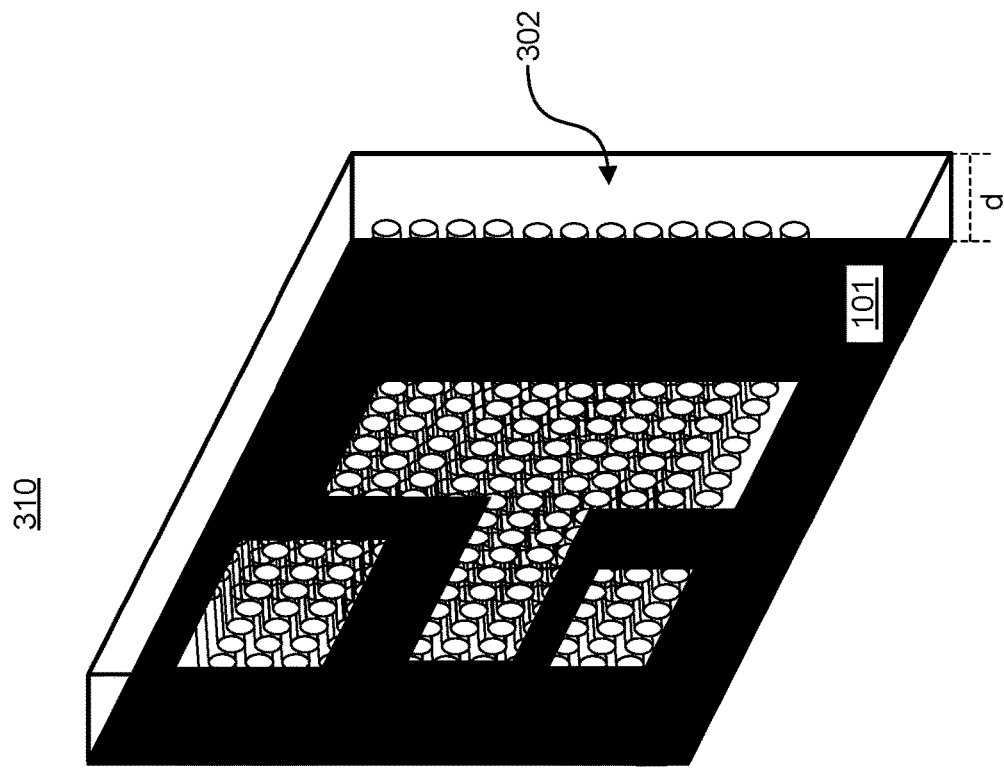
FIG. 3C illustrates another example guided light fiducial in accordance with embodiments of the technology disclosed herein.

In various embodiments, the plurality of light tubes 303 may be disposed in a uniform pattern 311 as shown in FIGS. 3C and 3D. The example guided light fiducial 310 is provided for illustrative purposes only and should not be interpreted as limiting the scope of the technology to the depicted embodiment. As shown in FIG. 3D, the uniform pattern 311 comprises a plurality of light tubes 303 disposed within the translucent base 302 irrespective of the design of the pattern layer 101. In various embodiments, the guided light fiducial 310 can be used with a plurality of different pattern layers 101, providing a universal translucent base 302. The pattern layer 101 can be interchangeably secured to the translucent base 302, and different pattern layers 101 can be secured to the translucent base 302 of the guided light fiducial 310 in various embodiments. The uniform pattern 311 of light tubes can be configured to guide light from a first side of the translucent base 302 to the second side of the translucent base 302, and light can be selectively passed by the pattern layer 101. Light can selectively pass through the pattern components 103 while light guided by light tubes 303 positioned behind the non-opened portions of the pattern layer 101 is blocked by the pattern layer 101.

The light tubes 303 can comprise a first face disposed in an exterior surface of the translucent base 302 and a second face disposed in an interior face of the translucent base 302, connected by a reflective tube. As light enters the first face on the exterior of the translucent base 302, it is reflected along the length of the reflective tube, and can exit the second face. In various embodiments, the first face and the second face of the translucent base 302 can comprise the same translucent material of the translucent base 302, while in other embodiments the first face and the second face can comprise one or more different translucent materials. In some embodiments, the first face on the exterior surface of the translucent base 302 can comprise an opening (not shown in FIG. 2) such that the reflective tube is accessible.

In various embodiments, the light tubes 303 can comprise a hole extending from the first surface to the second surface with a reflective coating on the interior walls of the hole. In various embodiments, each light tubes 303 can comprise one or more optical fibers disposed within the translucent base 302 and configured to couple external light at the first face to the opening on the second opening on the interior second face of the translucent base 302.

The plurality of light tubes 303 can comprise a translucent portion of the translucent base 302, while the remaining, non-tube portion of the translucent base 302 comprises a different type of material from the plurality of light tubes 303. In some embodiments, the non-tube portion can comprise an opaque material such that exterior light does not pass through the non-tube portion of the translucent base 302. In other embodiments, the non-tube portion may comprise the same or different translucent material as the translucent base 302.

Figure 4:
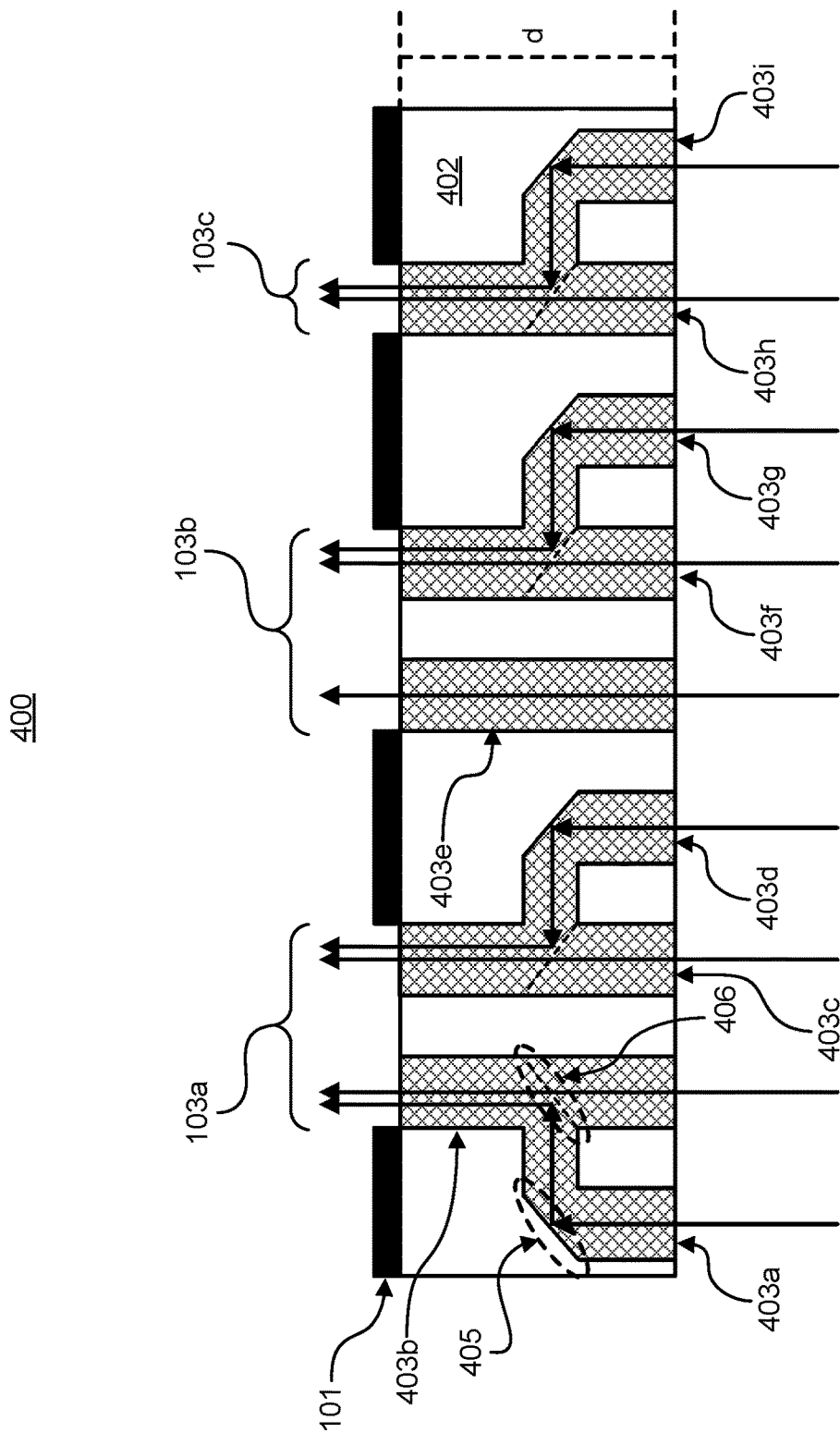
FIG. 4 illustrates another example guided light fiducial in accordance with embodiments of the technology disclosed herein.

FIG. 4 shows another example guided light fiducial 400 in accordance with embodiments of the technology of the present disclosure. The example guided light fiducial 400 is provided for illustrative purpose only and should not be interpreted as limiting the scope of the technology to only the depicted embodiment. Where references are common between figures it should be interpreted that discussions of those references are applicable to all figures containing the reference unless expressly stated otherwise. FIG. 4 provides a cross-sectional view of the guided light fiducial 400. As shown, the guided light fiducial 400 comprises a pattern layer 101 disposed on top of a translucent base 402. The translucent base 402 can be similar to the translucent bases 102 and 302 discussed with respect to FIGS. 1-3B and can comprise similar materials.

Instead of light tubes, a plurality of waveguides 403*a*-403*i* (generally, "the waveguide 403," collectively, "the waveguides 403") can be disposed within the translucent base 402. The translucent base 402 can comprise a semiconductor substrate, with the waveguide 403 disposed therein. In various embodiments, the waveguides 403 can include full waveguides 403*b*, 403*c*, 403*e*, 403*f*, 403*h* that are configured to extend from the first face of the translucent base 402 (i.e., the exterior face) to the second face of the translucent base 402 (i.e., the interior face, where the pattern layer 101 is disposed). The full waveguides can be disposed in a pattern corresponding to the pattern components 103 of the pattern layer 101. In various embodiments, each of the full waveguides can be configured to route light from the first face to the second face of the translucent base 402, similar to the light tubes 303 discussed with respect to FIGS. 3A and 3B. As illustrated, the full waveguides 403*b*, 403*c* are configured output light through the pattern component 103*a*, the full waveguides 403*e*, 403*f* are configured to output light through the pattern component 103*b*, and the full waveguide 403*h* is configured to output light through the pattern component 103*c*.

In some embodiments, a plurality of half waveguides 403*a*, 403*d*, 403*g*, 403*i* can be disposed within the translucent base 402 to increase the output of each of the full waveguides. In various embodiments, the half waveguides can extend from the first face to a point within the depth d of the translucent base 402 below the second face. In various embodiments, a first directional coupler 405 can be disposed at the end of the half waveguide. As a non-limiting example, a first directional coupler 405 is disposed at the end of the half waveguide 403*a* and configured to direct the light received through the input of the half waveguide 403*a* towards the full waveguide 403*b*. A partial reflector 406 can be disposed within the full waveguide 403*b*, configured to allow light entering the opening of the full waveguide 403*b* to pass while redirecting the light from the half waveguide 403*a*. In this way, extra light can be output through the full waveguide 403*b*.

By utilizing the natural light behind the visual fiducial, the technology of the present disclosure sharpens the edges of the encoded pattern on the pattern layer. In this way, the edge detection by the detection system can more consistently detect the visual fiduciary when it falls within the field of view of the detection system. Moreover, utilizing the natural back-lighting of the visual fiducial can compensate for changes in the lighting conditions. Visual fiducial systems can be used in uncontrollable environments where the lighting conditions may vary over time. As a non-limiting example, when performing research concerning a driver's (or passenger's) workflow during operation of a vehicle the visual fiducial system can be employed while the vehicle is in operation on public roads. A variety of obstructions can cause the lighting magnitude to change by blocking the sun or other light source. Further, shadows may be cast by one or more obstructions that falls on the area of the vehicle including a visual fiducial. With traditional fiducials, such changes could render the fiducial difficult to detect because of the darker environment. But, the translucent nature of fiducials in accordance with embodiments discussed herein allows an amount of light to pass through the pattern components of the fiducial to increase the contrast. In this way, the embodiments discussed herein are less sensitive to lighting conditions, compensating for wash-out effects and for dimming effects.

Figure 5:
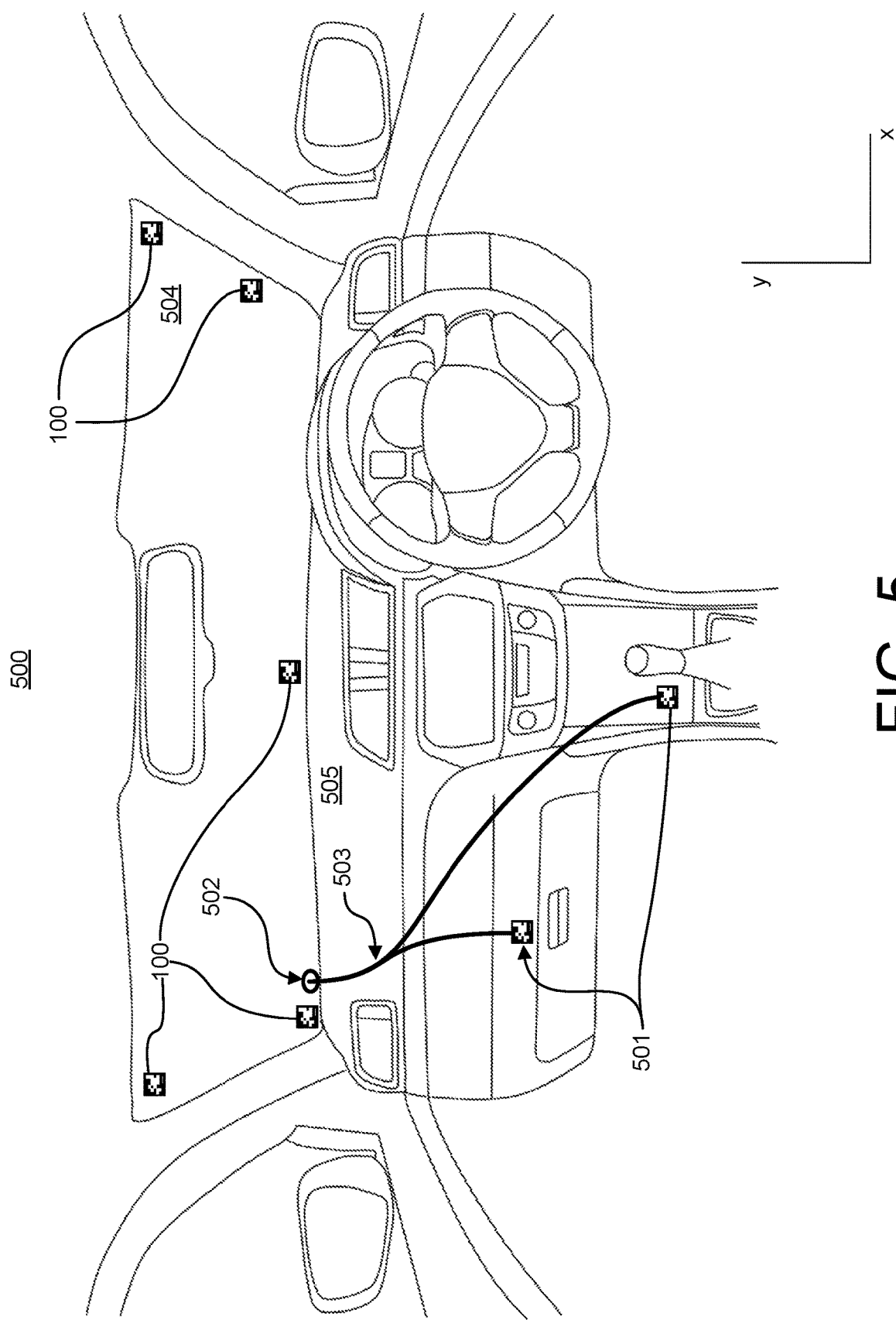
FIG. 5 is an example vehicle cabin in accordance with embodiments of the technology disclosed herein.

In some embodiments, the high-contrast visual fiducial technology can be utilized to include visual fiducials in areas lacking sufficient lighting for traditional opaque fiducials. FIG. 5 illustrates an example vehicle cabin 500 configured with example passively lit fiducials in accordance with embodiments of the technology disclosed herein. The example vehicle 500 is provided for illustrative purposes only and should not be interpreted as limiting the scope of the technology to only the depicted embodiment. Where references are common between figures it should be interpreted that the discussion of such references is applicable to all figures unless expressly stated to the contrary. As shown in FIG. 5, the example vehicle cabin 500 can have a plurality of high-contrast fiducials 100 disposed around the windshield 504. Although depicted using the high-contrast fiducials 100 discussed with respect to FIG. 1, other embodiments can include one or more other fiducial embodiments discussed with respect to FIGS. 1-4. As discussed above, external light (e.g., sunlight) can pass through the translucent base of the high-contrast fiducials 100 to enable easier detection by a detection system (e.g., cameras disposed on a helmet or glasses worn by the driver and/or passenger(s)).

One or more extended fiducials 501 can also be disposed within the vehicle cabin 500. The extended fiducials 501 can be placed in locations throughout the vehicle cabin 500 that generally does not have sufficient lighting for detection systems to detect the traditional, opaque fiducials. In various embodiments, the one or more extended fiducials 501 can be similar to the example fiducials discussed with respect to FIGS. 1-4, having a translucent base and a pattern layer disposed thereon. One or more optical fibers 503 can extend from an anchor point 502 disposed on the windshield to each of the one or more extended fiducials 501. In various embodiments, a plurality of optical fibers 503 may extend to each extended fiducial 501, each extended fiducial 501 can have a dedicated optical fiber 503, or a combination thereof. In various embodiments, the one or more optical fibers 503 can be routed on the exterior surface of a dashboard 505, while in other embodiments the one or more optical fibers 503 can be routed within the dashboard 505.

Exterior light from a light source (e.g., sunlight) can be routed from the anchor point 502 to the translucent base of each extended fiducial 501 through the one or more optical fibers 503. In some embodiments, each extended fiducial 501 can include one or more reflective surfaces (not shown in FIG. 5) disposed within the translucent base such that one or more optical fibers 503 can emit light into the translucent base in parallel to the pattern layer (i.e., along the y-axis and/or the x-axis) and the one or more reflective surfaces being configured to reflect the light through the pattern components of the pattern layer. In some embodiments, one or more extended fiducials 500 can be placed in locations where no light source or inadequate light passes through the translucent base towards the interior of the vehicle cabin 500. Non-limiting examples of such locations include support pillars, side mirrors, rearview mirrors, vents, instrument panels, controls (e.g., A/C, radio, navigation, etc.), shifter, glovebox, among others.

The embodiments discussed with respect to FIGS. 1-5 have been discussed with respect to passively allowing light to pass through the translucent base to increase the contrast of the edges of the pattern components, thereby making it easier to detect the pattern (i.e., the encoded information). In some embodiments, an active approach to lighting the pattern components of the patter layer can increase the contrast of the pattern component edges to make it easier for the detection system to detect the fiducials. FIG. 6A illustrates an example active visual fiducial 600A in accordance with embodiments of the technology disclosed herein. The example active visual fiducial 600A is provided for illustrative purposes only and should not be interpreted as limiting the scope of the technology to only the depicted embodiment. Where references are common it should be interpreted that discussion of the references are applicable to all the figures unless expressly stated otherwise. Although FIG. 6A is described with respect to light sources being aligned with the pattern components 103 of a pattern layer 101, in other embodiments the light sources can be disposed in a uniform manner, similar to that discussed above with respect to FIGS. 3C and 3D. In such embodiments, the discussion regarding the functionality of the example active visual fiducial 600A is applicable to a uniform active light source embodiment similar to FIGS. 3C and 3D.

As shown in FIG. 6A, the active visual fiducial 600A includes a pattern layer 101 comprising pattern components 103, similar to the fiducials discussed with respect to FIGS. 1-5. The pattern layer 101 can be disposed on a translucent base 602, the translucent base 602 being similar to the translucent bases discussed with respect to FIGS. 1-5. Unlike the fiducials discussed above, the translucent base 602 of FIG. 6A is configured with one or more light sources 603a-603c (generally, "the light source 603," collectively, "603") integrated therein. In various embodiments, the one or more light sources 603 can comprise one or more light-emitting diodes (LEDs). In some embodiments, one or more light sources 603 can comprise an array of LEDs. Each light source 603 can be configured to correspond with one of the pattern components 103 of the pattern layer 101, similar to the light tubes and/or optical routing elements discussed with respect to FIGS. 3A-5.

In various embodiments, the one or more light sources 603 can be disposed on a substrate 604, such as a printed circuit board (PCB) or other semiconductor substrate known in the art. Each of the one or more light sources 603 can be electrically coupled to a power source 610 over one or more electrical traces of the substrate 604. In various embodiments, the power source 610 can be disposed on an exterior of the active visual fiducial 600A as shown in FIG. 6A, while in other embodiments the power source 610 can be disposed on the substrate 604 and integrated within the translucent base 602. In some embodiments, the power source 610 can comprise a self-contained power source (e.g., one or more batteries), a receptacle for attaching to an external power supply, or a combination of both. In various embodiments, a controller 650 can be communicatively coupled to the substrate 604 and configured to control the light sources 603 and/or power source 610. In various embodiments, the controller 650 can be communicatively coupled to the substrate 604 over a wired and/or wireless connection, similar to the wired/wireless communication discussed with respect to FIG. 8 below. The controller 650 can comprise, but not limiting to, a central processing unit (CPU), an vehicle electronic control unit (vECU), an application specific integrated circuit (ASIC), a field programmable gate array (FPGA), or a combination thereof. The controller 650 can be similar to the one or more processors discussed below with respect to FIG. 10. In various embodiments, each active visual fiducial 600A, 600B can have a dedicated controller 650, while in other embodiments each controller 650 can be configured to control operation of one or more active visual fiducials 600A, 600B.

Figure 6B:
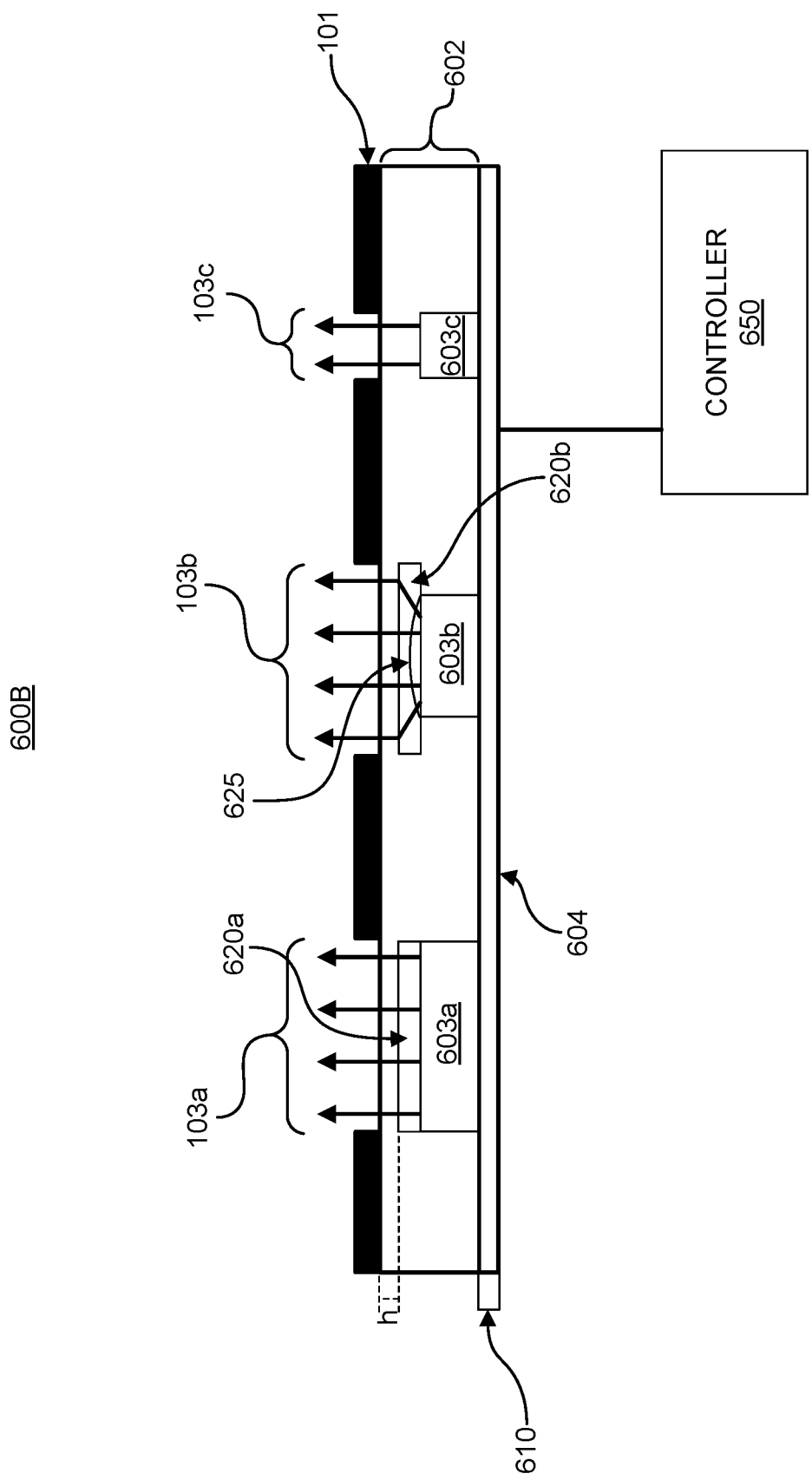
FIG. 6B illustrates another example active visual fiducial in accordance with embodiments of the technology disclosed herein.

Although not shown in FIGS. 6A and 6B, one or more memory components can be communicatively coupled to the controller 650 and configured to store non-transitory machine-readable instructions executable by the controller 650 to operate the active visual fiducials 600A, 600B, including but not limited to the memory components discussed below with respect to FIG. 10.

The substrate 604/light sources 603 can be integrated into the translucent base 602 in various ways. In some embodiments, the translucent base 602 can comprise a translucent material deposited on the substrate 604 and the light sources 603 using one or more deposition processes known in the art for semiconductor manufacturing. In other embodiments, the translucent base 602 can be attached to the substrate 604 using one or more types of adhesives and/or fasteners, such as the adhesives and/or fasteners discussed above with respect to FIGS. 1-5. The translucent base 602 can be configured to enable light generated by the one or more light sources 603 to pass through the pattern components 103 but not allowing the light sources 603 to be visible (i.e., translucent, not transparent).

In some embodiments, the translucent base 602 can be configured with one or more indentations having a height h extending from a top of the translucent base 602 (i.e., the surface on which the pattern layer 101 is disposed) to the top of the light sources 603, configured above the one or more light sources 603 to provide clearance for the light sources 603. In some embodiments, the height h can be determined such that the amount of light from the light sources 603 allowed to pass through the pattern components 103 results in a desired contrast level. The height h required for a desired contrast level can be dependent on the translucent material utilized for the translucent base 602, with some materials requiring a smaller height h to allow the same amount of light to pass as another material.

In some embodiments, the height h can be smaller than the distance from the top surface of the translucent base 602 to the top of the light sources 603. FIG. 6B illustrates another example active visual fiducial 600B in accordance with embodiments of the technology disclosed herein. The example active visual fiducial 600B is provided for illustrative purposes only and should not be interpreted as limiting the scope of the technology disclosed herein to only the depicted embodiment. Where references are common between figures, the discussion of such references should be interpreted as being applicable to all figures unless expressly stated otherwise. As shown in FIG. 6B, the height h of the indentation above the first light source 603a and the second light source 603b can be such that a gap 620a, 620b (generally, "the gap 620," collectively, "the gaps 620") are defined between the translucent base 602 and the light sources 603a, 603b, respectively. In various embodiment, one or more optical components can be disposed in one or more of the gaps 620. As shown in FIG. 6B, a lens component 625 can be disposed above the light source 603b to shape the light rays emitted from the light source 603b. In such embodiments, the lens component 625 can be used to fan-out the light emitted from the light source 603b so that a smaller light source can be utilized while still transmitting light corresponding to the pattern component 103b.

Figure 7:
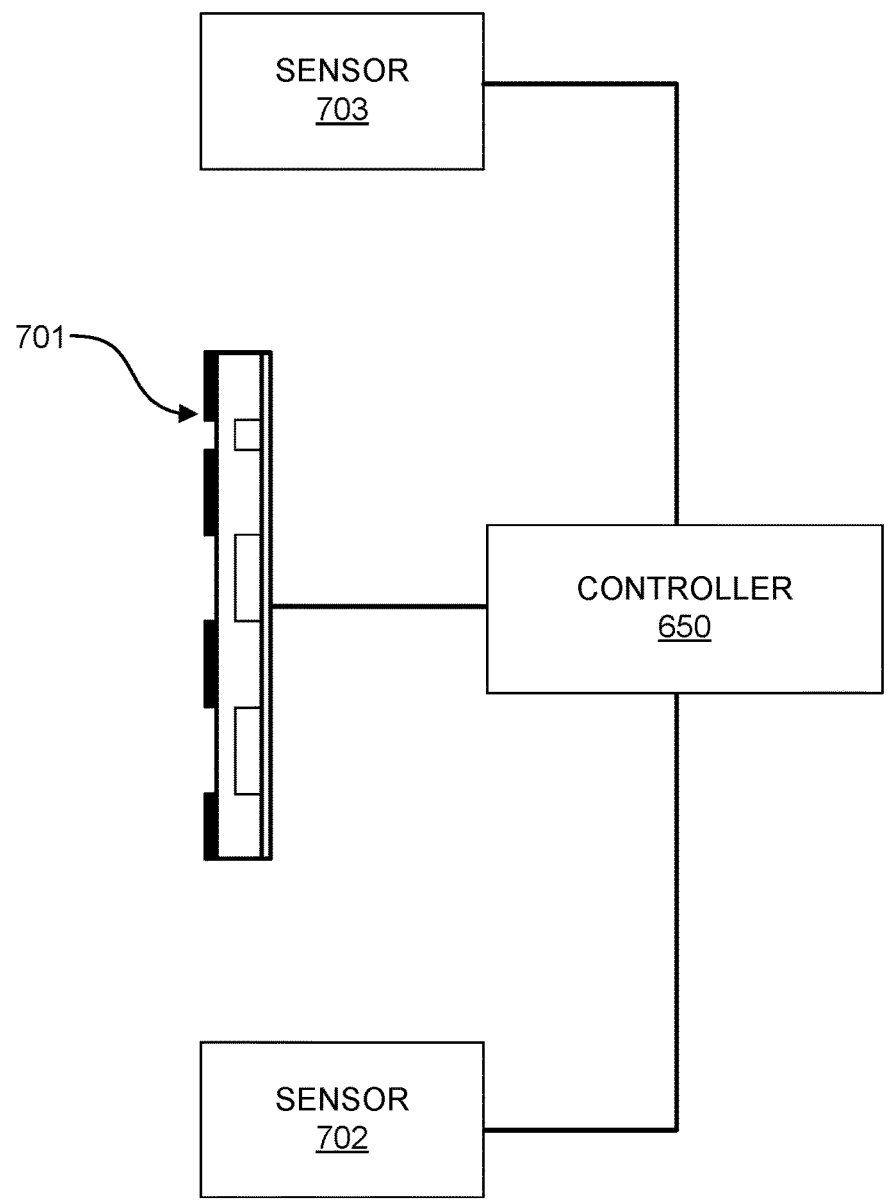
FIG. 7 illustrates an example active visual fiducial system in accordance with embodiments of the technology disclosed herein.

In some embodiments, the active visual fiducials 600A, 600B can be communicatively coupled to one or more sensors disposed within the vehicle cabin. FIG. 7 illustrates an example active visual fiducial system 700 in accordance with embodiments of the technology disclosed herein. The example active visual fiducial system 700 is provided for illustrative purposes only and should not be interpreted as limiting the scope of the technology disclosed herein to only the depicted embodiment. Where references are common between figures, the discussion of such references should be interpreted as being applicable to all figures unless expressly stated otherwise. As shown in FIG. 7, the active visual fiducial system 700 can comprise at least one active visual fiducial 701. In various embodiments, the at least one active visual fiducial 701 can comprise the active visual fiducial 600A or 600B discussed with respect to FIGS. 6A and 6B. Although only a single active visual fiducial 701 is shown in FIG. 7, in other embodiments the active visual fiducial system 700 can comprise a plurality of active visual fiducials 701.

The active visual fiducial 701 can be disposed within a vehicle cabin, similar to the visual fiducials 100, 501 discussed with respect to FIG. 5 above. As a non-limiting example, the active visual fiducial 701 can be disposed a glovebox of the dashboard. The active visual fiducial 701 can be used to provide higher contrast of the edges of the pattern components by passing light from the one or more light sources through a translucent base portion corresponding to the pattern components. In some contexts, however, the lighting conditions may vary. In such instances the amount of light necessary to ensure sufficient contrast may need to be increased or decreased to compensate for the variations. In various embodiments, one or more light sensors 702, 703 can be disposed within the vehicle cabin near the active visual fiducial 701. The one or more light sensors 702, 703 can comprise one or more types of light sensors known in the art, including but not limited to photodiodes, image sensing circuitry, among others. Each of the one or more light sensors 702, 703 can be configured to detect the lighting conditions around the active visual fiducial 701.

The one or more light sensors 702, 703 can be communicatively coupled to the controller 650. In various embodiments, the controller 650 can be communicatively coupled to the one or more light sensors 702, 703 over a wired and/or wireless connection, similar to the wired/wireless communication discussed with respect to FIG. 8 below. The controller 650 can be configured to receive sensor data from each of the one or more light sensors 702, 703 and calculate a lighting level around the active visual fiducial 701. As a non-limiting example, the controller 650 can be configured to execute one or more non-transitory machine-readable instructions to receive the sensor data and calculate the amount of light present around the active visual fiducial 701. In various embodiments, one or more light source settings can be associated with various ranges of lighting conditions (i.e., the amount of light present). As a non-limiting example, the light sources of the active visual fiducial 701 can have a low setting, a medium setting, and a high setting, with the low setting associated with lighting conditions less than or equal to a first amount of light, the high setting associated with light conditions greater than or equal to a second amount of light, and the medium setting associated with a third amount of light (i.e., lighting conditions greater than the first amount of light and less than the second amount of light). The ranges of lighting conditions and associations can be determined based on the parameters of the implementation, including but not limited to the material comprising the translucent base of the active visual fiducial 701, the type(s) of light source(s) of the active visual fiducial 701, the resolution of the type(s) of light source(s) of the active visual fiducial 701, the resolution of the one or more light sensors 702, 703, among others. In various embodiments, one or more of the light sources 702, 703 can be integrated into the active visual fiducial 701.

To increase the contrast between the edges of the pattern components, in some embodiments infrared or other non-visible light signals can be utilized. In such embodiments, one or more of the light sources of an active visual fiducial can comprise an infrared or other non-visible light source. As a non-limiting example, the active visual fiducial 600A can be configured to operate in the infrared range by implementing the one or more light sources 603 and the translucent base 602 comprising a material that is translucent in the infrared spectrum. In operation, the one or more light sources 603 are configured to emit infrared light that passed through the translucent base 602 and the pattern components 103. In such embodiments, the cameras of the detection system (such as the detection system discussed with respect to FIG. 2) can be infrared cameras configured to detect the infrared light passing through the translucent base 602. Using infrared reduces the impact of lighting conditions by utilizing non-visible light.

In various embodiments, a combination of visible and non-visible (e.g., infrared) light sources can be integrated into the same active visual fiducial. In such embodiments, the controller 650 can be configured to determine whether to turn on the visible light sources or the non-visible light sources depending on the lighting conditions detected by the one or more light sensors 702, 703.

In some embodiments, the fiducial can be configured such that the light source is not directed towards the detection system (e.g., the detection system 202 discussed with respect to FIG. 2) but is reflected back towards the detection system. With reference to FIG. 1 and FIG. 2, the pattern layer 101 of the visual fiducial 204 can comprise a non-reflective material (corresponding to the solid area of the pattern layer 101) and a retroreflective material (disposed where the openings of the pattern layer 101 in FIG. 2 are placed). In such embodiments, the detection system 202 can include a non-visible light source configured to emit non-visible light towards the visual fiducial 204. When the non-visual light intersects with the visual fiducial 204, the non-reflective material of the pattern layer 101 can absorb the non-visible light, while the retroreflective material representing the pattern components (i.e., the pass-through portions of the pattern layer 101) can be configured to reflect the non-visible light back towards the detection system 202. In such embodiments, the detection system 202 can be configured to detect the reflected non-visible light, similar to the non-visible light detection discussed above, and identify the fiducial pattern.

Figure 8:
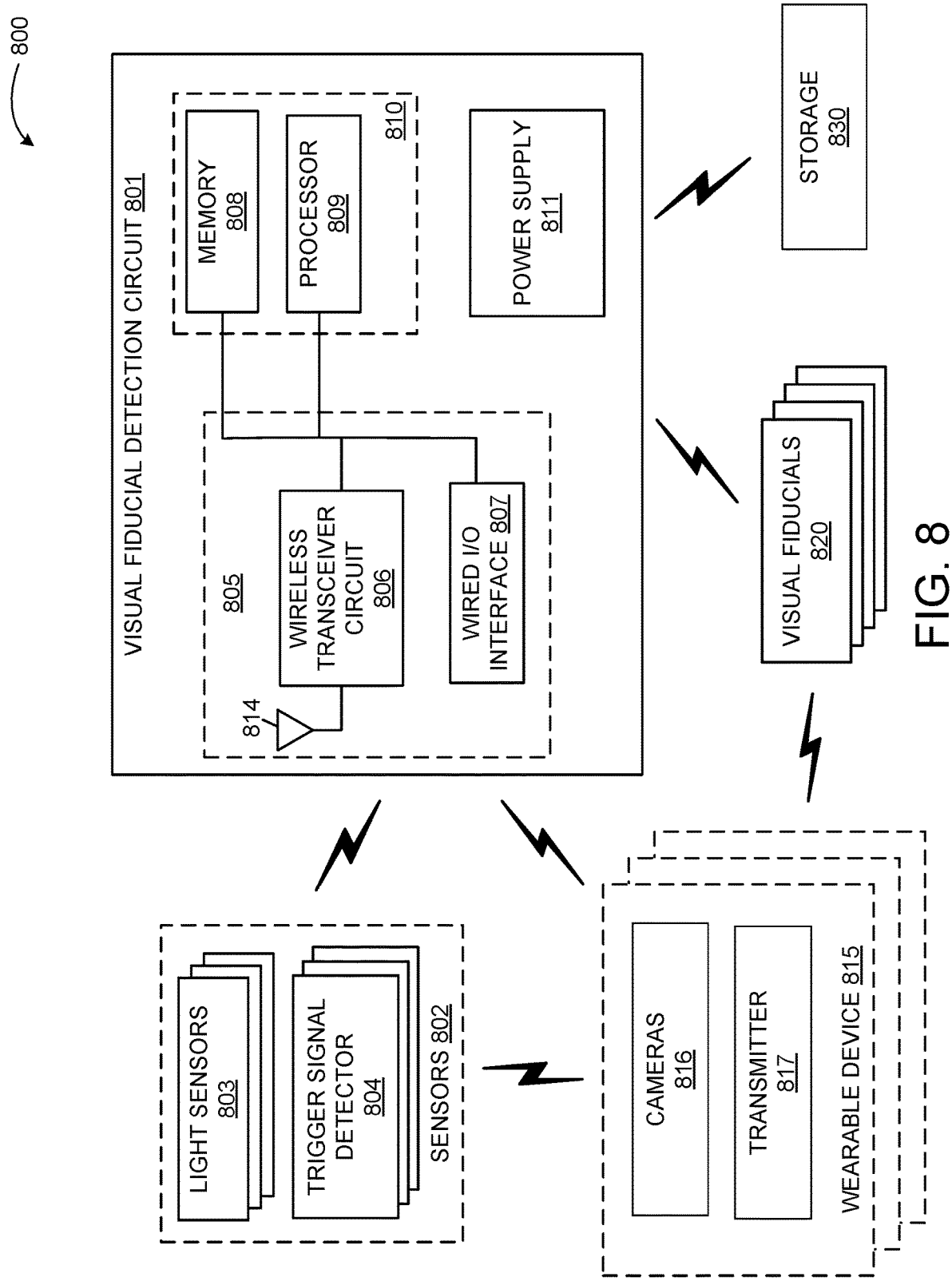
FIG. 8 illustrates an example architecture in accordance with embodiments of the technology disclosed herein.

FIG. 8 illustrates an example architecture 800 for obtaining visual fiducial-assisted data in accordance with embodiments of the systems and methods described herein. The example architecture 800 is provided for illustrative purposes only and should not be interpreted as limiting the scope of the technology to only the depicted architecture. Referring to FIG. 8, the architecture 800 includes a visual fiducial detection circuit 801, a plurality of sensors 802, a plurality of visual fiducials 820, one or more wearable devices 815, and a storage 830. The plurality of sensors 802, the plurality of visual fiducials 820, the one or more wearable devices 815, and the storage 830 can communicate with the visual fiducial detection circuit 801 via a wired or wireless communication interface. Although the sensors 802 and the visual fiducials 820 are depicted as communicating with the visual fiducial detection circuit 801, they can also communicate with each other as well. The visual fiducial detection circuit 801 can be implemented in various embodiments as an ECU or as part of an ECU of a vehicle, such as, as a non-limiting example, the controller 650. In some embodiments, the visual fiducial detection circuit 801 can be implemented independently of a vehicle's ECU. In various embodiments, the visual fiducial detection system 801 can be implemented in a processing component associated with one or more visual fiducials 820.

The visual fiducial detection system 801 in this example includes a communication circuit 805, a decision circuit 810 (including a processor 808 and memory 809 in this example) and a power supply 811. Components of the visual fiducial detection circuit 801 are illustrated as communicating with each other via a data bus, although other communication in interfaces can be included.

Processor 809 can include one or more GPUs, CPUs, microprocessors, or any other suitable processing system. Processor 809 may include a single core or multicore processors. The memory 808 may include one or more various forms of memory or data storage (e.g., flash, RAM, etc.) that may be used to store the calibration parameters, images (analysis or historic), point parameters, instructions and variables for processor 809 as well as any other suitable information. Memory 808, can be made up of one or more modules of one or more different types of memory, and may be configured to store data and other information as well as operational instructions that may be used by the processor 809 to control operation of the visual fiducial detection circuit 801 and manage the detection system architecture 800

Although the example of FIG. 8 is illustrated using processor and memory circuitry, as described below with reference to circuits disclosed herein, decision circuit 810 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the visual fiducial detection circuit 801.

Communication circuit 805 can include a wireless transceiver circuit 806 with an associated antenna 814 and/or a wired I/O interface 807 with an associated hardwired data port (not illustrated). As this example illustrates, communications with the visual fiduciary detection circuit 801 can include either or both wired and wireless communications circuit 805. Wireless transceiver circuit 806 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 814 is coupled to wireless transceiver circuit 806 and is used by wireless transceiver circuit 806 to transmit radio signals wirelessly to wireless equipment with which it is connected and to receive radio signals as well. These RF signals can include information of almost any sort that is sent or received by the visual fiducial detection circuit 801 to/from other entities such as sensors 802, wearable devices 815, visual fiducials 820, and the storage 830.

Wired I/O interface 807 can include a transmitter and a receiver (not shown) for hardwired communications with other devices. For example, wired I/O interface 807 can provide a hardwired interface to other components, including sensors 802, wearable devices 815, visual fiducials 820, and the storage 830. Wired I/O interface 807 can communicate with other devices using Ethernet or any of a number of other wired communication protocols whether standardized, proprietary, open, point-to-point, networked or otherwise.

Power supply 811 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

The plurality of sensors 802 can comprise one or more types of sensors configured to capture data and/or detect a signal. In various embodiments, the plurality of sensors 802 can include one or more light sensors 803. The one or more light sensors 803 can be similar to the light sensors 702, 703 discussed with respect to FIG. 7. Although shown as separate from the visual fiducials 820, in some embodiments each visual fiducial 820 can have one or more light sensors 803 integrated therewith. In various embodiments, one or more of the one or more light sensors 803 may be configured to detect the lighting conditions related to a plurality of the visual fiducials 820. The lighting conditions data captured by the one or more light sensors 803 can be communicated to the visual fiducial detection circuit 801 over the wireless transceiver circuit 806 or the wired I/O interface 807. Each of the one or more light sensors 803 can include communication circuitry, similar to the communication circuitry 805 discussed above.

In some implementations, the visual fiducials can include one or more sensors configured to trigger the active lighting elements discussed with respect to FIGS. 6A-7. In such implementations, one or more trigger signal detectors 804 can be included in the plurality of sensors 802. In various embodiments, the one or more trigger signal detectors 804 can be configured to detect a signals transmitted from a transmitter 817 disposed on a wearable device 815 within the system. In various embodiments, the trigger signal detector 804 can be configured to receive a directional infrared or RF signal. When the trigger signal detector 804 received the signal from the transmitter 817 it determines that the driver and/or passenger(s) are looking in the area of the vehicle interior where one or more visual fiducials 820 may be disposed. After the trigger signal from the transmitter 817 is received, the respective trigger signal detector 804 can be configured to turn one or more light sources on, such as the visible and non-visible light sources discussed with respect to FIGS. 6A-7. This can provide power savings and add another data point for use in performing analysis on the data (e.g., point-to-polygon analysis). As a non-limiting example, ray-casting can be used to perform a point-in-polygon analysis.

One or more wearable devices 815 can be deployed within the system during operation. In various embodiments, the driver 815 of a vehicle can have a wearable device 815, including but not limited to glasses, a helmet, a head band, a heads-up display (HUD), or other wearable device 815 capable of tracking the driver's line of sight and eyes, and capture the real-world scene in the driver's field of view. In various embodiments, each person within the vehicle can have a wearable device 815. Each wearable device 815 can include a plurality of cameras 816. In various embodiments, a first set of the plurality of cameras 816 may be disposed on and/or in the wearable device 815 and configured to monitor and capture the person's head and eyes position. A second set of the plurality of cameras 816 can be configured to capture the field of view of the person. In various embodiments, one or more of the cameras 816 may be configured to capture the real-world scene within the person's field of view, including one or more visual fiducials 820 within the field of view of the person. In other embodiments, one or more of the cameras 816 may be configured to capture one or more non-visible and/or visible light signals from the one or more visual fiducials 820.

During operation, the visual fiducial detection system 801 can be configured to identify one or more visual fiducials 820 captured by the second set of cameras 816 and the position of the person's eyes by the first set of cameras 816. In some embodiments, the visual fiducial detection system 801 can be configured to identify the relevant one or more visual fiducials 820 captured by the second set of cameras 816. In such embodiments, the memory 808 may include one or more non-transitory machine-readable instructions executable by the processor 809 to associate the eye data captured by the first set of cameras 816 and the visual fiducials 820 captured by the second set of cameras 816. In some embodiments, the memory may further include one or more non-transitory machine-readable instructions executable by the processor 809 to perform one or more analysis on the associated data to identify where the person is looking in the area bounded by the one or more visual fiducials 820, such as but not limited to point-to-polygon analysis and/or focus determination.

The data received from the one or more wearable devices 815 can be used to determine where the person's focus is during operation of the vehicle through analysis. Determining a person's focus can be used in determining how to design one or more HMIs within the vehicle. As a non-limiting example, if the driver is determined to focus on the infotainment system of the vehicle for an excessive amount of time, the implication could be that the layout and controls of the infotainment system are not user friendly, requiring more attention and raising the risk of distracted driving. Using this information, the infotainment system can be redesigned with a more intuitive HMI.

In some embodiments the visual fiducial detection circuit 801 can be configured to forward the received data and/or the post-analysis data to the storage 830. The storage 830 can comprise one or more types of non-transitory memory components, including but not limited to the memory components discussed above with respect to the memory 808. In various embodiments, the storage 830 can be accessible by one or more other processing components and systems to use the information received from the visual fiducial detection circuit 801.

Figure 9:
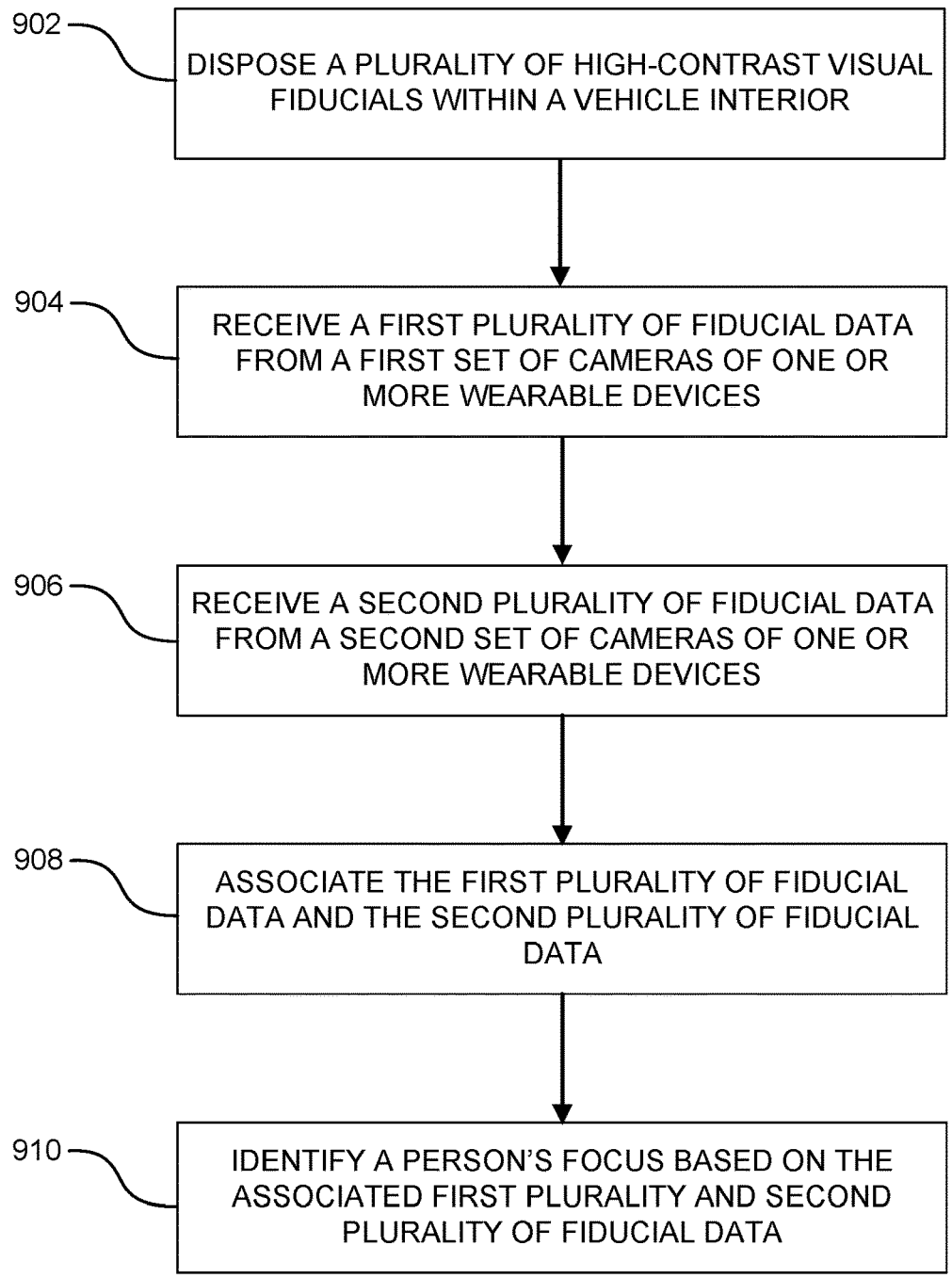
FIG. 9 illustrates an example method in accordance with embodiments of the technology disclosed herein.

FIG. 9 illustrates an example method 900 in accordance with the embodiments of the technology disclosed herein. The example method 900 is provided for illustrative purposes only and should not be interpreted as limiting the scope of the technology to only the depicted method. As shown in FIG. 9, at operation 902 a plurality of high-contrast visual fiducials are disposed within a vehicle interior. The plurality of high-contrast visual fiducials can comprise one or more of the passively lit fiducials discussed with respect to FIGS. 1-5 and 8 and the active visual fiducials discussed with respect to FIGS. 6-8. In various embodiments, the high-contrast visual fiducials can be disposed such that light from an external source (such as, for a non-limiting example, sunlight) can pass through a translucent base of the high-contrast visual fiducials and out a plurality of pattern components of a pattern code disposed thereon. In some embodiments, one or more of the high-contrast visual fiducials can be connected to an anchor point by one or more optical fibers, the optical fibers configured to route light from an external source to the translucent base of the visual fiducial, thereby enabling the light to pass through the translucent base and out the pattern components.

At operation 904 a visual fiducial detection system can receive a first plurality of fiducial data from a first set of cameras of one or more wearable devices. The visual fiducial detection system can be similar to the architecture 800 discussed with respect to FIG. 8 in some embodiments. In various embodiments, the one or more wearable devices can comprise the wearable devices discussed with respect to FIG. 8. The first plurality of fiducial data can be captured by a first set of one or more cameras of the wearable device configured to capture the person's eye and head movements. In various embodiments, the first set of one or more cameras can capture both visible and non-visible data related to the position of the person's eyes. This information can be utilized to the determine where the person's focus is over time.

At operation 906 the visual fiducial detection system can receive a second plurality of fiducial data from a second set of cameras of one or more wearable devices. The second set of cameras of the wearable devices can be configured to capture information in the direction the person is facing. In various embodiments, one or more of the second set of cameras is configured to capture visible and/or non-visible fiducial data. The second plurality of fiducial data can comprise a visual recording of the real-world scene within the field of view of the person, infrared data captured by an infrared camera, or a combination thereof. In some embodiments, the plurality of fiducial data can further include visual and/or infrared data captured by one or more cameras positioned outside of the person's field of view to capture information on the peripheral scene. Such information can be used in some embodiments to determine where the person is focusing during operation of the vehicle.

The visual fiducial detection system can associate the first plurality of fiducial data with the second plurality of fiducial data at operation 908. In various embodiments, the first plurality and second plurality of fiducial data can include one or more bits of metadata to enable association. Non-limiting examples of the metadata include time stamps, identification of visual fiducials captured by the one or more cameras, identification of the camera of the set of cameras from which the fiducial data was captured, data stamp, or a combination thereof. At operation 910, the associated first plurality and second plurality of fiducial data can be used by the visual fiducial detection system to identify a person's focus. The identification process can include, but is not limited to, point-to-polygon analysis using the captured visual fiducials as references.

Although the technology disclosed herein has been discussed with respect to operation of a vehicle (e.g., an automobile), the enhanced visual fiducial detection system disclosed herein is applicable to a plurality of different environments where fiducial information is useful in performing analysis. As a non-limiting example, the visual fiducials disclosed herein can be disposed within a factory along the production line, and can be used to track the focus of workers on the line to assist in designing intuitive HMI interfaces for manufacturing equipment to increase efficiency and productivity.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 10. Various embodiments are described in terms of this example-computing component 100. After reading this description, it will become apparent to a person skilled in the relevant art how to implement the application using other computing components or architectures.

Figure 10:
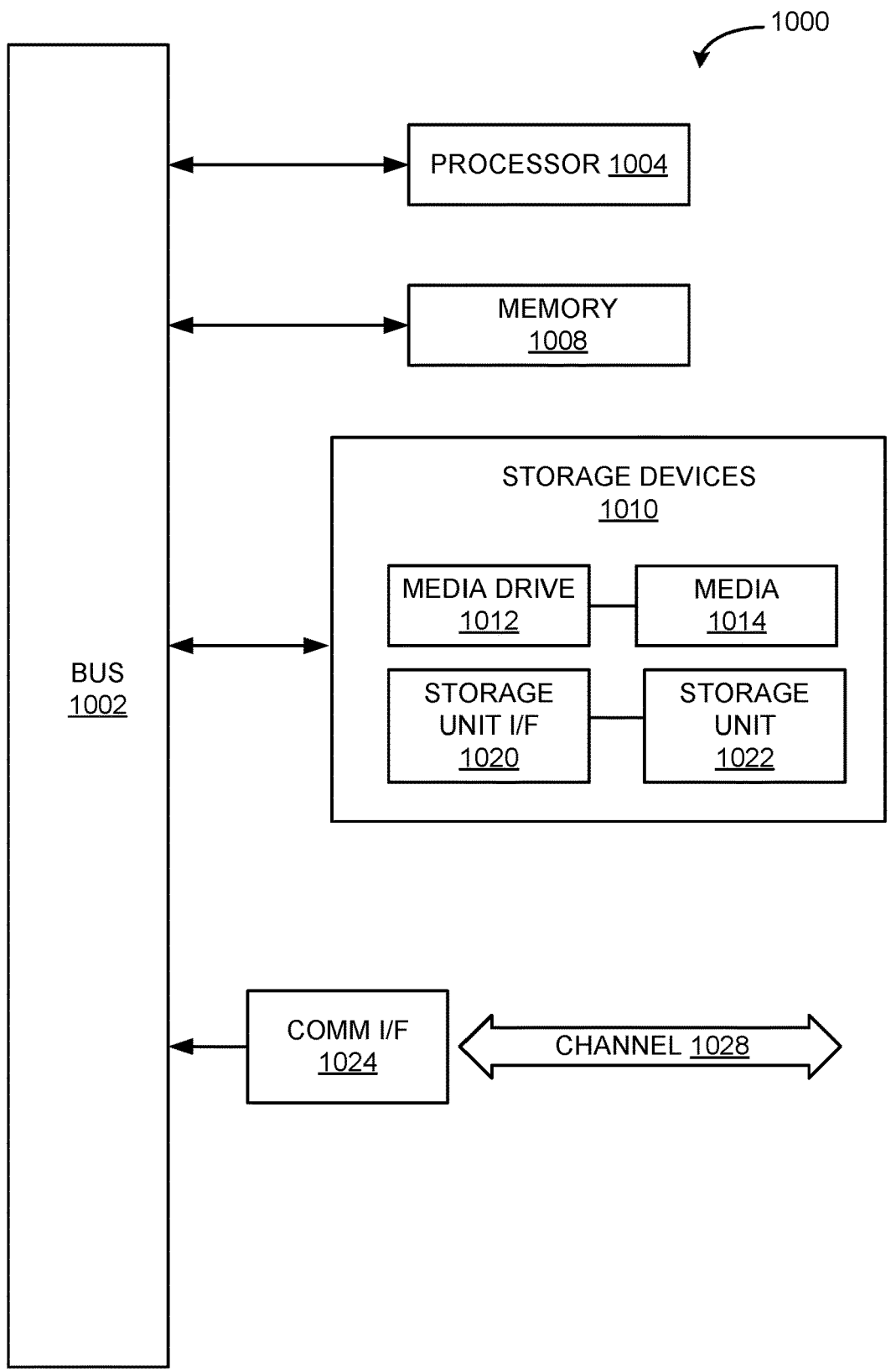
FIG. 10 is an example computing component that may be used to implement various features of embodiments described in the present disclosure.

Referring now to FIG. 10, computing component 1000 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, portable computing devices, and other electronic devices that might include some form of processing capability.

Computing component 1000 might include, for example, one or more processors, controllers, control components, or other processing devices. This can include a processor, and/or any one or more of the components making up the controller 650, plurality of sensors 802, and/or the cameras disposed on the one or more wearable devices 815. Processor 1004 might be implemented using a general-purpose or special-purpose processing engine such as, for example, a microprocessor, controller, or other control logic. Processor 1004 may be connected to a bus 1002. However, any communication medium can be used to facilitate interaction with other components of computing component 1000 or to communicate externally.

Computing component 1000 might also include one or more memory components, simply referred to herein as main memory 1008. For example, random access memory (RAM) or other dynamic memory, might be used for storing information and instructions to be executed by processor 804. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid-state drive, a magnetic tape drive, an optical drive, a compact disc (CD) or digital video disc (DVD) drive (R or RW), or other removable or fixed media drive might be provided. Storage media 1014 might include, for example, a hard disk, an integrated circuit assembly, magnetic tape, cartridge, optical disk, a CD or DVD. Storage media 1014 may be any other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory component) and memory slot. Other examples may include a PCMCIA slot and card, and other fixed or removable storage units 1022 and interfaces 1020 that allow software and data to be transferred from storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1024 may be carried on signals, which can be electronic, electromagnetic (which includes optical) or other signals capable of being exchanged by a given communications interface 1024. These signals might be provided to communications interface 1024 via a channel 1028. Channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1008, storage unit 520, media 1014, and channel 1028, and the memory 808 and storage 830 of FIG. 8. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A high-contrast visual fiducial comprising:
   a translucent base comprising a plurality of light tubes, a plurality of waveguides, or a combination of both; and
   a pattern layer disposed on the translucent base, the pattern layer comprising a plurality of pattern components;
   wherein the translucent base is configured to route light through the plurality of pattern components.

2. The high-contrast visual fiducial of claim 1, wherein the pattern layer comprises an opaque material configured to block light from passing through the pattern layer.

3. The high-contrast visual fiducial of claim 1, further comprising one or more optical fibers configured to route light from an external source to the translucent base, wherein the routed light from the optical fiber passes through the plurality of pattern components.

4. The high-contrast visual fiducial of claim 1, further comprising one or more light sources integrated within the translucent base and configured to emit light through the plurality of pattern components.

5. A method comprising:
   disposing a plurality of high-contrast visual fiducials within a vehicle interior;
   receiving, from a first set of cameras of a wearable device, a first plurality of fiducial data;
   receiving, from a second set of cameras of the wearable device, a second plurality of fiducial data;
   associating the first plurality of fiducial data and the second plurality of fiducial data; and
   identifying the focus of attention of a person wearing the wearable device based on the associated first plurality of fiducial data and the second plurality of fiducial data;
   wherein the high-contrast visual fiducials are configured to enable light to pass through one or more pattern components of a pattern disposed on a translucent base.

6. The method of claim 5, wherein a first set of the high-contrast visual fiducials are configured to route light from an external source through the translucent base of each high-contrast visual fiducial.

7. The method of claim 6, wherein the first set of high-contrast visual fiducials are disposed on a windshield of a vehicle.

8. The method of claim 6, wherein the first set of high-contrast visual fiducials are disposed on a non-window portion of the vehicle interior, each high-contrast visual fiducial communicatively coupled to an anchor point disposed on a windshield of the vehicle configured to route light from the external source to the translucent base of each high-contrast visual fiducial.

9. The method of claim 5, further comprising:
   receiving from one or more light sensors lighting condition data;
   for each light sensor, determining an amount of light detected by the light sensor based on the received lighting condition data from the respective light sensor;
   determining, based on the determined amount of light, a lighting level;
   determining a setting for one or more light sources of one or more high-contrast visual fiducials based on the determined amount of light; and
   setting the one or more light sources to the determined setting.

* * * * *